(12) United States Patent
Bienenstein, Jr.

(10) Patent No.: US 6,290,013 B1
(45) Date of Patent: Sep. 18, 2001

(54) BATTERY TRAY HAVING ACID MANAGEMENT FEATURES

(75) Inventor: Charles A. Bienenstein, Jr., Chesterfield, MI (US)

(73) Assignee: DaimlerChrysler Corporation, Auburns Hills, MI (US)

( * ) Notice: Subject to any disclaimer, the term of this patent is extended or adjusted under 35 U.S.C. 154(b) by 0 days.

(21) Appl. No.: 09/442,951

(22) Filed: Nov. 18, 1999

(51) Int. Cl.⁷ .......................... B60R 16/04; B62D 25/20; B62D 27/00
(52) U.S. Cl. ..................... 180/68.5; 180/69.1; 296/38
(58) Field of Search ................... 180/68.2, 68.5, 180/69.1; 429/34, 100, 163, 175, 176; D12/223; D13/119, 120; 296/38; 220/573, 572; D32/55

(56) References Cited

U.S. PATENT DOCUMENTS

| | | |
|---|---|---|
| D. 260,760 | 9/1981 | Sybert, Jr. . |
| D. 262,104 | 12/1981 | Simpson . |
| D. 269,672 | 7/1983 | Seltzer et al. . |
| 1,382,980 * | 6/1921 | Hunt ................................. 180/68.5 |
| 2,196,578 * | 4/1940 | Greig ................................ 180/68.5 |
| 2,618,351 * | 11/1952 | Giacosa . |
| 4,098,366 | 7/1978 | Reinhard et al. . |
| 4,327,809 | 5/1982 | Fenstermaker . |
| 4,577,713 * | 3/1986 | Moon .................................. 180/69.1 |
| 4,891,270 * | 1/1990 | Jergl ....................................... 429/53 |
| 5,031,712 * | 7/1991 | Karolek ................................ 180/68.2 |
| 5,482,181 * | 1/1996 | Weaver ................................. 220/573 |
| 5,484,667 * | 1/1996 | Sahli ..................................... 429/100 |
| 5,547,036 * | 8/1996 | Gawaskar ............................. 180/68.5 |
| 5,636,701 | 6/1997 | Norman et al. . |
| 5,697,227 * | 12/1997 | Bruce ...................................... 62/285 |
| 5,911,812 * | 6/1999 | Stanek .................................... 99/446 |
| 6,102,356 * | 8/2000 | Huntley ................................. 248/500 |
| 6,152,096 * | 11/2000 | Setsuda ........................... 123/184.21 |
| 6,182,394 * | 2/2001 | Bassler ................................... 47/65.5 |
| 6,216,811 * | 4/2001 | Herc .................................... 180/68.5 |

* cited by examiner

*Primary Examiner*—Frank Vanaman
*Assistant Examiner*—David Divine
(74) *Attorney, Agent, or Firm*—Mark P. Calcaterra

(57) ABSTRACT

A battery tray for a motor vehicle which substantially reduces the accidental spill of acid to other parts of the motor vehicle is disclosed. The battery tray includes a planar surface, a front wall, a back wall, and first and second side walls. A first drain trough is disposed on the center of the floor, and a second drain trough is connected to the first drain trough through a drain passage. A third drain trough is offset at an angle from the second trough. The battery tray also includes a drain hole disposed on the third trough and a removable hose attached to the drain hole. The pitch of the troughs are angled in such a way to prevent any acid spill from contacting other parts of the motor vehicle and to direct the flow of the acid towards the drain hole and away from motor vehicle parts.

18 Claims, 3 Drawing Sheets

BATTERY TRAY HAVING ACID MANAGEMENT FEATURES

BACKGROUND OF THE INVENTION

1. Technical Field

The present invention relates generally to motor vehicle battery housing tray and, in particular, to a battery housing tray with a trough system that will direct any acid spills towards a drain and away from other parts of the motor vehicle.

2. Discussion

With respect to conventional battery tray or battery housing designs, the primary focus in the art has been to ensure a good seating of the battery in the tray or housing. However, no attention has been paid to the degradation of components of the motor vehicle surrounding the tray of the housing. Moreover, there has been very little focus on providing a battery tray or housing tray that will prevent acid leaks to other parts of the motor vehicle. Further, known battery housing or tray designs fail to provide a cost effective solution for directing battery acid away from vehicle components. In view of the above, it is desirable to provide a battery tray which directs battery acid, or water containing battery acid away from the components of the vehicle.

SUMMARY OF THE INVENTION

In accordance with the teachings of the present invention, a battery tray with a trough system to direct any acid toward a drain and away from other parts of the vehicle is provided. The present invention reduces or limits the accidental acid spill to other parts of the vehicle by plugging or damming all the points where such spill can occur and directing the flow of the acid toward the drain. Another object of the present invention is to provide a battery tray that can easily replace existing battery tray designs without any substantial increase in cost. Finally, it is desirable to provide a battery tray that can support other vehicle components within the engine compartment.

In particular, the present invention includes a battery tray having a substantially planar surface having a front wall, a back wall, and first and second side walls. The center of the surface has an opening for receiving a temperature measuring device. The first drain trough is formed around this opening and is disposed below the bottom surface of the battery tray. Further, the tray includes a second drain trough connected to the first drain trough through a drain passage. The second drain trough is generally perpendicular to the passage and parallel to the front wall. Additionally, the battery tray contains a third drain trough that is offset at an angle to the second trough. The pitch of the drain troughs are all angled in such a way that the acid flow is towards the drain. The third drain trough has a drain hole that has a hose attached thereto.

The present invention also provides that the mounting points for the battery tray are outside the battery support area. In particular, the battery tray has two support brackets for securing the battery tray within the engine compartment. To prevent movement of the battery, the battery is securely fastened to the battery housing tray by way of a battery retainer. The battery tray of the present invention can be economically manufactured from molded plastic, glass reinforced plastic or other suitable formable material. However, it is preferable to make the tray out of materials that are highly resistant to acid corrosion. The various features, objects and advantages of the present invention will be more apparent from a review of the following description of the drawings and invention in detail.

DETAILED DESCRIPTION OF THE PREFERRED EMBODIMENT

Figure 1:
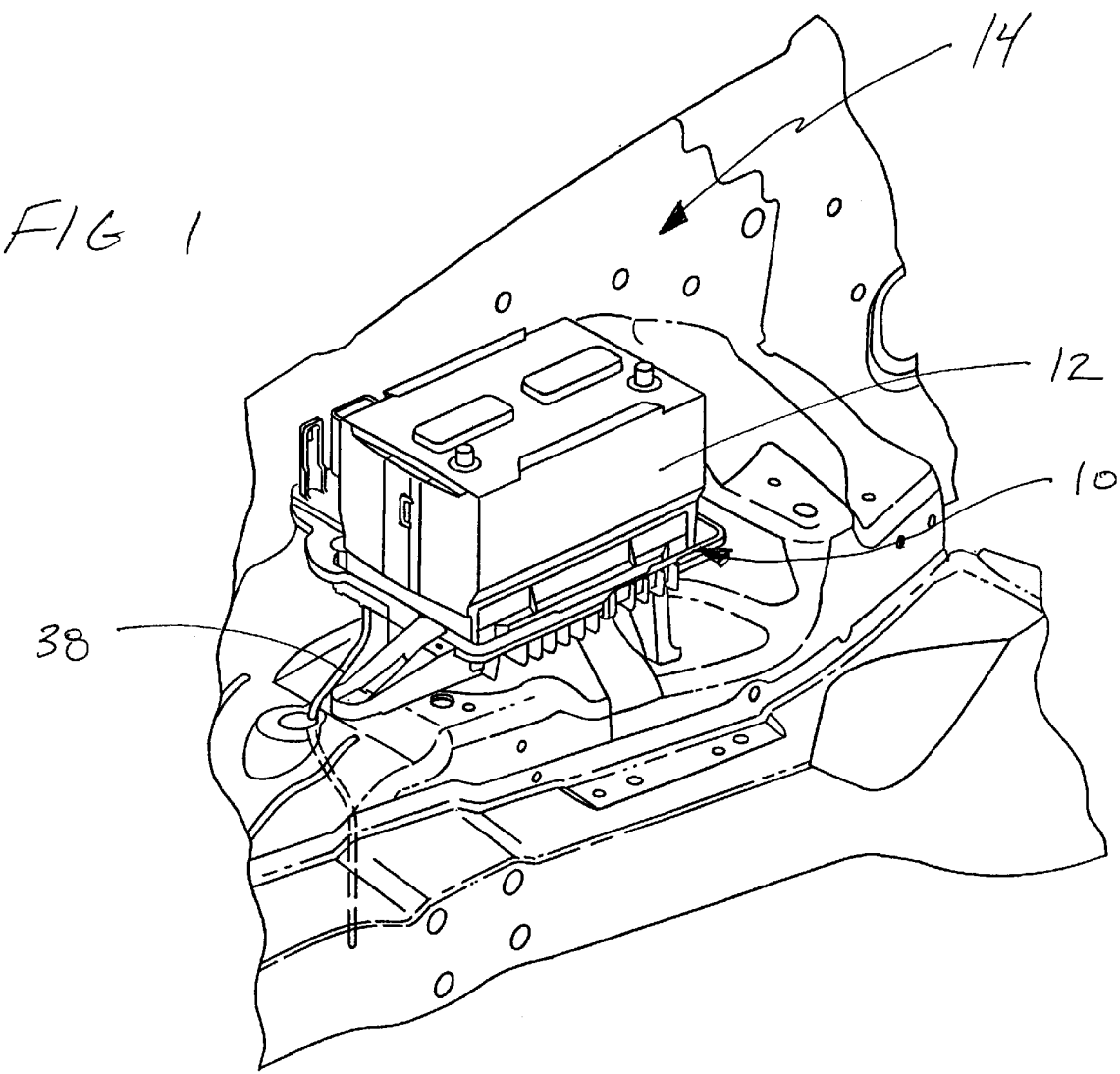
FIG. 1 is a perspective view showing the general placement of the battery tray within the engine compartment of a motor vehicle.

With reference to FIG. 1, a battery tray 10 for receiving a battery 12 is shown installed within the engine compartment 14 of an automobile. Also shown in FIG. 1, is a hose 38 attached to the drain hole formed in the battery tray 10 (not shown in FIG. 1).

Figure 2:
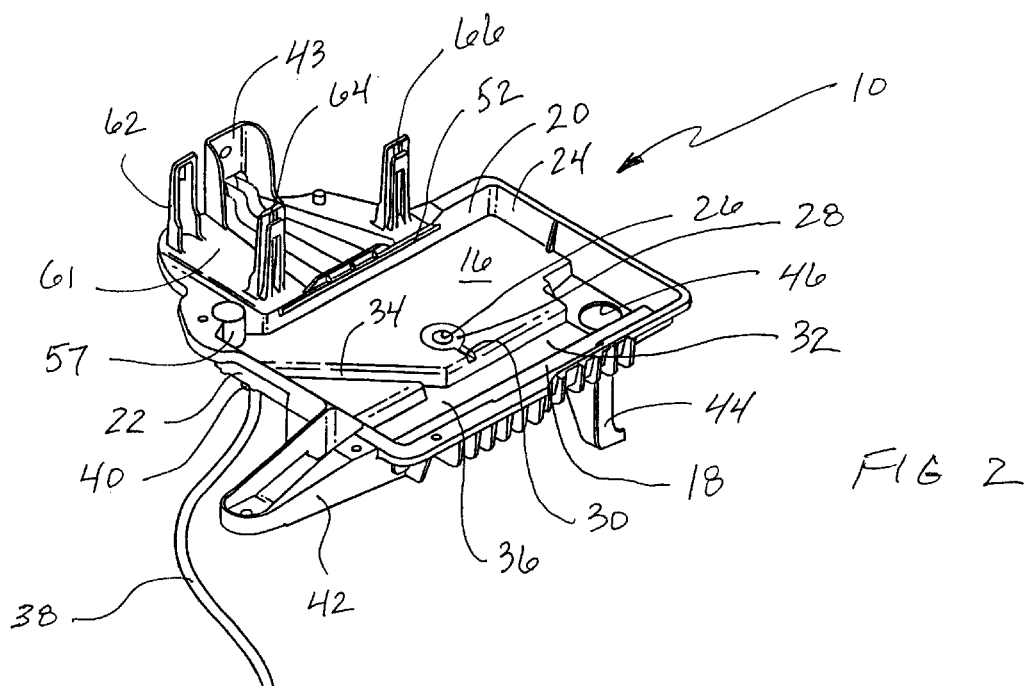
FIG. 2 is a perspective view of the battery tray in accordance with a preferred embodiment of the present invention.
Figure 3:
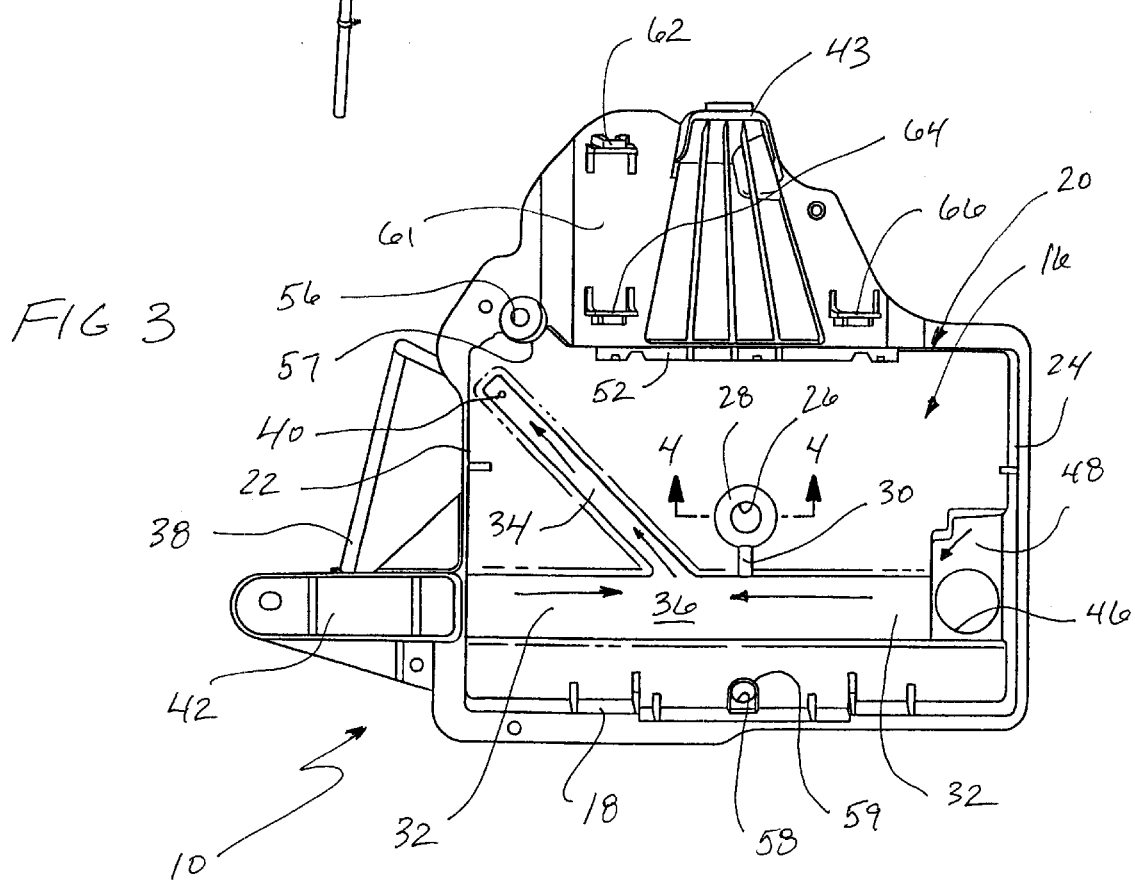
FIG. 3 is the top view of the battery tray.

The battery tray 10 is shown in detail in FIG. 2 and FIG. 3. Referring to these figures, the battery tray 10 has a bottom surface 16 that is substantially planar, a front wall 18, a back wall 20 and two side walls 22 and 24. The battery tray 10 also includes support brackets 42, 43 and 44 that are molded into the battery tray 10. The shape of the bottom surface 16 is rectangular as shown in FIGS. 2 and 3, however, it should be understood that the shape and dimensions of the battery tray 10 will vary depending on the shape and dimensions of the battery 12.

Figure 4:
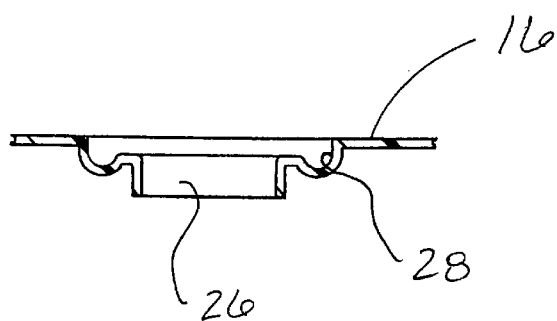
FIG. 4 is the cross sectional view of the center drain trough taken along section line 4—4 of FIG. 3.
Figure 5:
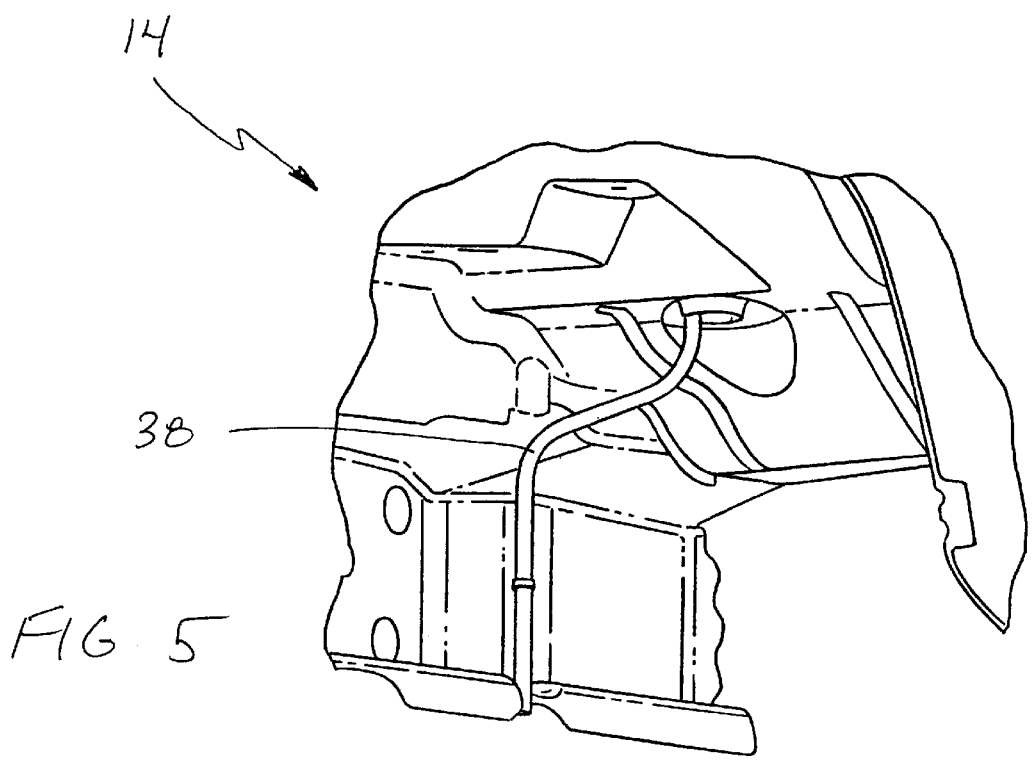
FIG. 5 shows the placement of the drain hose in the motor vehicle.

With continued reference to FIGS. 2 and 3, the floor 16 has an opening 26 at the center for receiving a temperature sensing device such as the thermometer. Preferably the temperature sensing device provides battery temperature feedback to the vehicle's alternator. A first annular drain trough 28 is disposed around the opening 26, approximately at the center of the floor 16. The first drain trough 28 is substantially circular in shape and is connected to the second drain trough 32 through a drain passage 30. A cross sectional view of the center drain trough 28 is clearly shown in FIG. 4. The drain passage 30 is slightly deeper than the first drain trough 28 to promote acid flow therethrough. Thus, any acid that is collected in the first drain trough 28 will flow through the drain passage 30 and into the second drain trough 32. A second drain trough 32 is formed perpendicular to the drain passage 30 and is parallel to the front wall 18. The second drain trough 32 has more depth than the drain passage 30. This will allow the acid to easily flow towards the second drain trough 32. The surface 16 has a third drain trough 34 disposed at an angle to the second drain trough 32. The third drain trough 34 has a generally rectangular cross section and extends from the second drain trough 32 towards the back wall 20. At the outset it must be stated the third trough 34 may be perpendicular or offset at an angle with respect to the second drain trough 32. The third drain trough 34 has more depth than the second drain trough 32. Thus, the third drain trough 34 is the deepest portion of the surface 16. At the point where the second drain trough 32 and the third drain trough 34 merge, a well 36 is formed that directs the flow of the acid towards the third drain trough 34. The flow of acid is clearly depicted in FIG. 3. The second drain trough 32 may slope from the side walls 22 and 24 towards the well 36. The third drain trough 34 has a drain hole 40. A drain hose 38 is attached to a fitting forming the drain hole 40. As shown in FIG. 5 the hose 38 is attached to the vehicle in such a way that it directs the acid away from other components of the vehicle.

Another unique feature of the present invention is that the mounting points of the battery tray 10 are isolated from the battery 12 and the surface 16. This minimizes any leaks from the mounting points and acid spills are restricted to the battery tray 10. The battery tray 10 is mounted inside the engine compartment 14 with the help of the three support brackets 42, 43 and 44, that are integrally molded into the battery tray 10. The first support bracket 42 is fixedly attached to the first side wall 22, and is co-planar with floor 16. The first bracket 42 is attached to a side wall of the vehicle with a suitable fastener. The second support brackets 44 is also fixedly attached to second side wall 24 and is perpendicular to the floor 16. The top end of the second support bracket has a removable plug 46 that can be attached once the battery tray 10 is mounted inside the motor vehicle. The area around the plug 46 has a sloped portion 48 which slopes toward the second drain trough 32. Sloped portion 48 will ensure that any acid collected in that area will drain towards the second drain trough 32.

Figure 6:
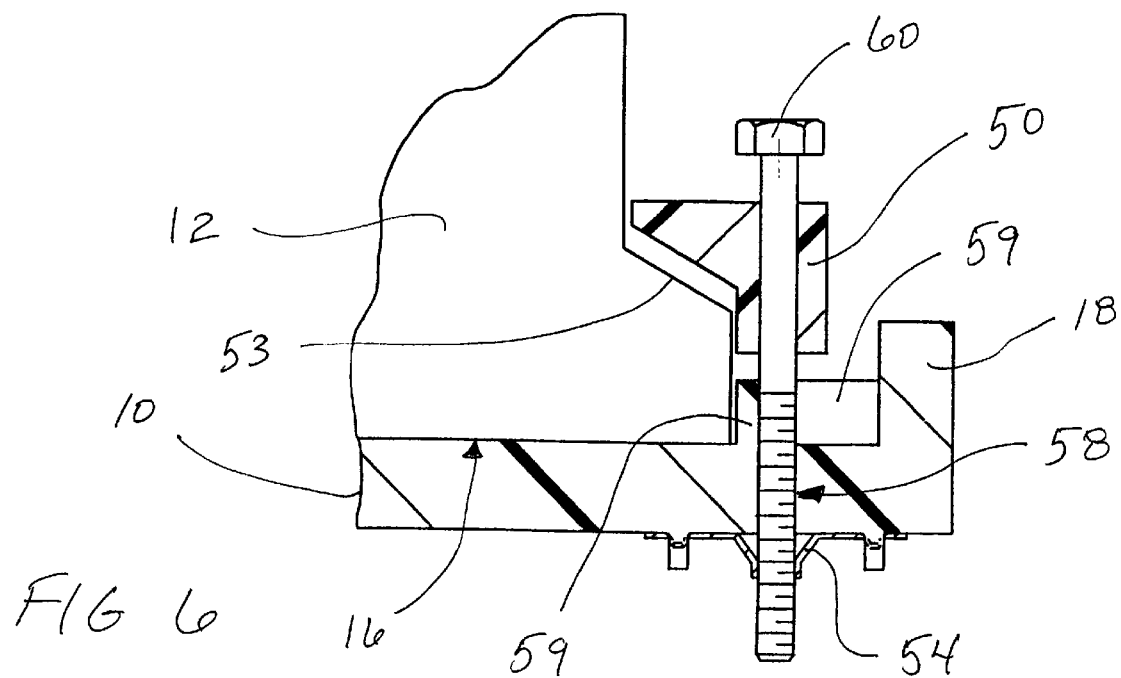
FIG. 6 is a partial sectional view showing the details of the battery hold down device.

With reference to FIG. 6 battery 12 is secured to the battery tray 10 with a battery hold down 50. The battery hold down 50 engages a lip 53 formed along the front side of the battery. An opposing fixed hold down 52 is molded into the back wall 20 (FIG. 3) and engages an opposing lip (not shown) formed along the back side of the battery. A threaded retainer 54 is secured to the underside of the battery tray 10. The threaded retainer 54 receives a suitable threaded fastener 60 for securing the battery 12 to the battery tray 10 by way of the battery hold down 50.

Referring back to FIGS. 2 and 3, the tray surface 16 includes an aperture 56 to receive a suitable fastener to mount the battery tray 16 to other components of the motor vehicle. Surface 16 also includes aperture 58 to receive threaded fastener 60 used to secure the tray 16 to other components of the motor vehicle. To avoid any acid leak from the apertures 56, 58 a raised wall 57 and 59 is formed around each of the apertures 56 and 58 respectively A cross-section of the raised wall 59 is also shown in FIG. 6. The back wall 20 also includes a platform 61 for holding a fuse box (not shown). The fuse box is held to the platform 61 by way of three mounting brackets 62, 64, and 66. The platform 61 may be integrally molded with the battery tray 10 or may be attached separately.

As should be understood upon a review of the foregoing description, the drain troughs 28, 30, 32 and 34 are pitched to promote free flow of acid from the battery towards the drain hole 40. As part of the present invention, the potential leak points are sealed and any acid spill is restricted to the battery tray 10. This prevents any accidental spills of acid from contacting other parts of the vehicle thereby preventing any mechanical problems commonly associated with acid spills from the battery.

While the above detailed description describes the preferred embodiment of the present invention, the invention is susceptible to modification, variation and alteration without deviating from the scope and fair meaning of the subjoined claims.

What is claimed is:

1. A battery tray for a motor vehicle comprising:
   a substantially planar surface defining a battery tray floor, said floor having a front wall, a back wall, and first and second side walls;
   a first drain trough disposed on the center of said floor;
   a second drain trough connected to said first drain trough through a drain passage, said second drain trough being generally perpendicular to said passage and parallel to said front wall;
   a third drain trough offset at an angle to said second drain trough, wherein said third drain trough and said second drain trough are connected to form a well disposed along said second drain trough; and
   wherein said third drain trough has more depth than said second drain trough and said second drain trough has more depth than said first drain trough and
   said drain passage has more depth than said first drain trough and less depth than said second drain trough.

2. The battery tray of claim 1 wherein said second drain trough slopes from said first and second side walls towards said well.

3. The battery tray of claim 1 wherein one end of said third drain trough has a drain hole.

4. The battery tray of claim 3 wherein a hose is removeably attachable to said drain hole.

5. The battery tray of claim 1 wherein a first support bracket is fixedly attached to said first side wall.

6. The battery tray of claim 1 wherein a second support bracket is fixedly attached to said second side wall.

7. The battery tray of claim 1 wherein a third support bracket is fixedly attached to said back wall.

8. The battery tray of claim 6 wherein a top of the said second support bracket has a removable plug attached to a portion of said floor.

9. The battery tray of claim 8 wherein a surface around said plug is generally sloped at an angle towards said second drain trough.

10. The battery tray of claim 1 wherein said back wall includes a bracket portion for securing the battery tray to a side wall of the engine compartment.

11. The battery tray of claim 1 wherein a platform is formed along said back wall, said platform having a plurality of retaining brackets for supporting a fuse box.

12. The battery tray of claim 1 wherein said front wall receives a battery hold down.

13. The battery tray of claim 12 wherein said battery hold down includes a treaded retainer for receiving a threaded fastener for securing said battery to said battery tray.

14. The battery tray of claim 13 wherein said surface has an aperture for receiving said fastener.

15. A battery tray for a motor vehicle comprising:

a substantially planar surface defining a battery tray floor, said floor having a front wall, a back wall, and first and second side walls;

an aperture at the center of said floor for receiving a battery temperature sensor;

a first drain trough disposed around said aperture, said first trough being substantially annular in shape;

a second drain trough connected to said first drain trough through a drain passage, said second drain trough being generally perpendicular to said passage and parallel to said front wall;

a third drain trough offset at an angle to said second trough, wherein said third drain trough and said second drain trough are connected to form a well disposed along said second drain trough;

a first aperture in proximity to said back wall for receiving a fastener, said first aperture having a wall for preventing acid spill from contacting said aperture; and a second aperture in proximity to said front wall for receiving a fastener, said second aperture having a wall for preventing acid spill from contacting said aperture.

16. The battery tray of claim 15 wherein one end of said third drain trough has a drain hole, said drain hole having a hose removably attached thereto.

17. The battery tray of claim 15 wherein a platform is fixedly attached to said back wall.

18. The battery tray of claim 17 wherein said platform has a plurality of mounting brackets for supporting a fuse box.

* * * * *